United States Patent [19]

Niedrach

[11] Patent Number: 5,130,080

[45] Date of Patent: * Jul. 14, 1992

[54] METHOD OF PROVIDING EXTENDED LIFE EXPECTANCY FOR COMPONENTS OF BOILING WATER REACTORS

[75] Inventor: Leonard W. Niedrach, Schenectady, N.Y.

[73] Assignee: General Electric Company, Schenectady, N.Y.

[*] Notice: The portion of the term of this patent subsequent to Jul. 14, 2009 has been disclaimed.

[21] Appl. No.: 502,720

[22] Filed: Apr. 2, 1990

[51] Int. Cl.$^5$ ............................................. G21C 9/00
[52] U.S. Cl. .................................... 376/305; 376/306
[58] Field of Search ................ 376/305, 306; 428/685, 428/670; 427/6, 5

[56] References Cited

U.S. PATENT DOCUMENTS

| | | | |
|---|---|---|---|
| 3,343,979 | 9/1967 | Hamrin | 427/6 |
| 3,783,005 | 1/1974 | Kenney | 427/5 |
| 4,097,402 | 6/1978 | Grubb | 376/305 |
| 4,123,594 | 10/1978 | Chang | 428/670 |
| 4,477,538 | 10/1984 | Clarke | 428/685 |
| 4,917,968 | 4/1990 | Tuffias et al. | 428/670 |

OTHER PUBLICATIONS

Chernova, G. P. et al., "Increasing the Passivability and Corrosion Resistance of Stainless Steels by Surface Alloying with Palladium", Plenum Publishing Corporation, UDC 620.197.3 (1982) pp. 406–411.
Chernova, G. P. et al., "Increasing the Passivation Ability and Corrosion Resistance of Chromium Steel by Surface Alloying With Palladium", Surface Technology 13 (1981) pp. 241–256.
I. R. McGill, "Platinum Metals In Stainless Steels, A Review of Corrosion and Mechanical Properties", Platinum Metals Rev 34(2) (1990) pp. 85–97.
"Palladium Impedes Radionuclide Pick-Up in Steel", Platinum Metals Rev 33[4] (1989) p. 185.
H. Ocken et al., "Thin Films to Impede the Incorporation of Radionuclides in Austenitic Stainless Steels", Elsevier Sequoia, printed in The Netherlands (1989) pp. 323–334.

*Primary Examiner*—Brooks H. Hunt
*Assistant Examiner*—Frederick H. Voss
*Attorney, Agent, or Firm*—Paul E. Rochford; James C. Davis, Jr.; James Magee, Jr.

[57] ABSTRACT

A method of extending the life of components of newly constructed nuclear reactors or newly replaced components of existing reactors is taught. The method involves forming a deposit on the surfaces of metallic elements of the nuclear containment, as well as on the surfaces of internal components which are exposed to high-temperature, high-pressure water and steam. The deposit formed is a deposit of at least one member of the platinum group of metals. The deposit is formed by any of a number of conventional methods such as electroless deposition, electrochemical deposition, chemical vapor deposition, sputtering or other conventional method. In operation, this deposit facilitates the combination of hydrogen and oxygen to form water and thereby aids in reducing the electrochemical corrosion potential of the system to values below a critical potential range that prevents stress corrosion cracking.

10 Claims, 5 Drawing Sheets

METHOD OF PROVIDING EXTENDED LIFE EXPECTANCY FOR COMPONENTS OF BOILING WATER REACTORS

CROSS-REFERENCE TO RELATED APPLICATION

The present invention relates to application Ser. No. 07/502,721 filed Apr. 2, 1990, the text of which is incorporated herein by reference.

BACKGROUND OF THE INVENTION

The present invention relates generally to improving the operating characteristics of nuclear reactors. More specifically, it relates to extending the useful life of components of a reactor by facilitating the reduction of stress corrosion cracking of such components of a boiling water reactor or other reactors or reactor components containing high-temperature water.

Boiling water reactor components are known to undergo stress corrosion cracking. Stress corrosion cracking is a phenomenon which occurs principally in apparatus exposed to high temperature and, accordingly, high-pressure water. Stress corrosion cracking occurs as well at lower temperatures. The stress arises from differences in thermal expansion, the high pressure needed for the containment, and other sources including residual stress from welding, cold work and other asymmetric treatments. In addition to the stress, other conditions including sensitization of the metal and water chemistry influence the sensitivity to stress corrosion cracking (SCC). This type of corrosion has been widely studied and a number of papers have been written concerning it.

Among them are:

1) F.P. Ford, "Stress Corrosion Cracking", in *Corrosion Processes*, edited by R.N. Parkins, Applied Science Publishers, New York, 1982, p. 271.

2) J.N. Kass and R.L. Cowan, "Hydrogen Water Chemistry Technology for BWRs", in *Proc. 2nd Int. Conf on Environmental Degradation of Materials in Nuclear Power Systems--Water Reactors*, Monterey, Calif., 1985, p. 211.

3) M.E. Indig, B.M. Gordon, R.B. Davis and J.E. Weber, "Evaluation of In-Reactor Intergranular Stress" in *Proc. 2nd Int. Conf on Environmental Degradation of Materials in Nuclear Power Systems--Water Reactors*, Monterey, Calif, 1985, p. 411.

4) L.G. Ljungberg, D. Cubicciotti and M. Trolle, "Materials Behavior in Alternate (Hydrogen) Water Chemistry in the Ringhals-1 Boiling Water Reactor", *Corrosion*, Vol.42, (1986) p. 263.

5) L.W. Niedrach and W.H. Stoddard, "Corrosion Potentials and Corrosion Behavior of AISI304 Stainless Steel In High Temperature Water Containing Both Dissolved Hydrogen and Oxygen", *Corrosion*, Vol. 42, No. 12 (1986) page 696.

It is well documented that stress corrosion cracking occurs at higher rates when oxygen is present in the reactor water in higher concentrations.

As explained in these and other articles, efforts have been made to lower the stress corrosion cracking in boiling water reactor piping by lowering oxygen levels in the cooling water through hydrogen injection to achieve higher concentrations than normally present in the water as a result of radiological decomposition. It has been found that varying amounts of hydrogen have been required to reduce oxygen levels sufficiently to achieve and reliably maintain a critical potential required for protection from the SCC in the high temperature, high pressure water. Accordingly, the problem of stress corrosion cracking of stainless steel components, including piping of boiling water reactors, has remained a significant problem. The present invention is aimed at reducing the amount of $H_2$ required as well as at facilitating reliable maintenance of the corrosion potential below a critical value of $-230$ to $-300$ mV vs. the standard hydrogen electrode (SHE) at which SCC is markedly reduced or even eliminated as indicated in references 3 and 4.

Two additional papers deal with the formation of noble metal deposits on reactor piping and other containment structures and they are as follows:

(6) H. Ocken, C.C. Lin, and D.H. Lister, "Thin Films to Impede the Incorporation of Radio Nucleides in Austenetic Stainless Steels", *Thin Solid Films*, Vol. 171 (1989) pages 323-334.

(7) G.P. Chernova, T.A. Fedosceva, L.P. Kornienko, and N.D. Tomashov, "Increasing Passivation Ability and Corrosion Resistance of Stainless Steel by Surface Alloying with Palladium", *Prot. Met.* (Eng. Transl.) 17 (1981) page 406.

The first of these articles deals with the use of metal deposits and other treatments and deposits to reduce the build-up of radioactivity in components of the circulatory system of a nuclear reactor that are in contact with the coolant.

The second of these articles deals with the electrochemical behavior and general corrosion resistance of stainless steel as distinct from stress corrosion cracking.

BRIEF STATEMENT OF THE INVENTION

It is, accordingly, one object of the present invention to improve the method by which stress corrosion cracking of a boiling water reactor is reduced through hydrogen injection into the recirculating feedwater.

Another object is to provide a boiling water reactor in which the degree of stress corrosion cracking is of low order.

Another object is to provide stainless steel containment for the boiling water reactor which is less subject to stress corrosion cracking.

Still another object is to provide a stainless steel piping structure capable of holding high temperature, high pressure boiling water with lower degree of stress corrosion cracking.

Other objects will be in part apparent and in part pointed out in the description which follows.

In one of its broader aspects, objects of the present invention can be achieved by providing a boiling water reactor structure in which hydrogen and oxygen are present in the water of the reactor. A thin film of a noble metal is formed on the surface of the containment system which is exposed to the boiling water. This noble metal may be palladium, platinum, or one of the other platinum metals of low reactivity and of high catalytic activity for a combination reaction of hydrogen and oxygen. Deposition of the noble metal either singly or as an alloy on the containment metal may be accomplished by electroless plating, electroplating, sputtering, displacement reactions, evaporation, chemical vapor deposition, ion implantation, or by other similar methods. Additional hydrogen is injected into the water in the reactor at a concentration sufficient to bring the electrochemical potential of the exposed stainless steel to less than −230 to −300 mV relative to the standard hydrogen electrode.

An alternative scheme for ensuring the presence of a platinum metal at the surface of a structural element subject to stress crack corrosion is by incorporating the platinum metal or metals directly into the structural metal itself. This can be accomplished by alloying the platinum metal into the structural metal at the time of formation.

As used herein the term platinum metals or plantinum has its usual connotation in the art and particularly in the catalytic arts. It includes osmium, ruthenium, iridium, rhodium, platinum, and palladium. The platinum metals can be used as alloys of one platinum metal with another. Alternatively, a platinum metal may be provided by alloying one of the platinum metals into another metal such as a stainless steel. Osmium, which forms volatile compounds, is preferably not included as a surface layer but is preferably incorporated into an alloy either with other platinum metals or into an alloy with the substrate to be protected by the present method.

DETAILED DESCRIPTION OF THE INVENTION

Figure 1:
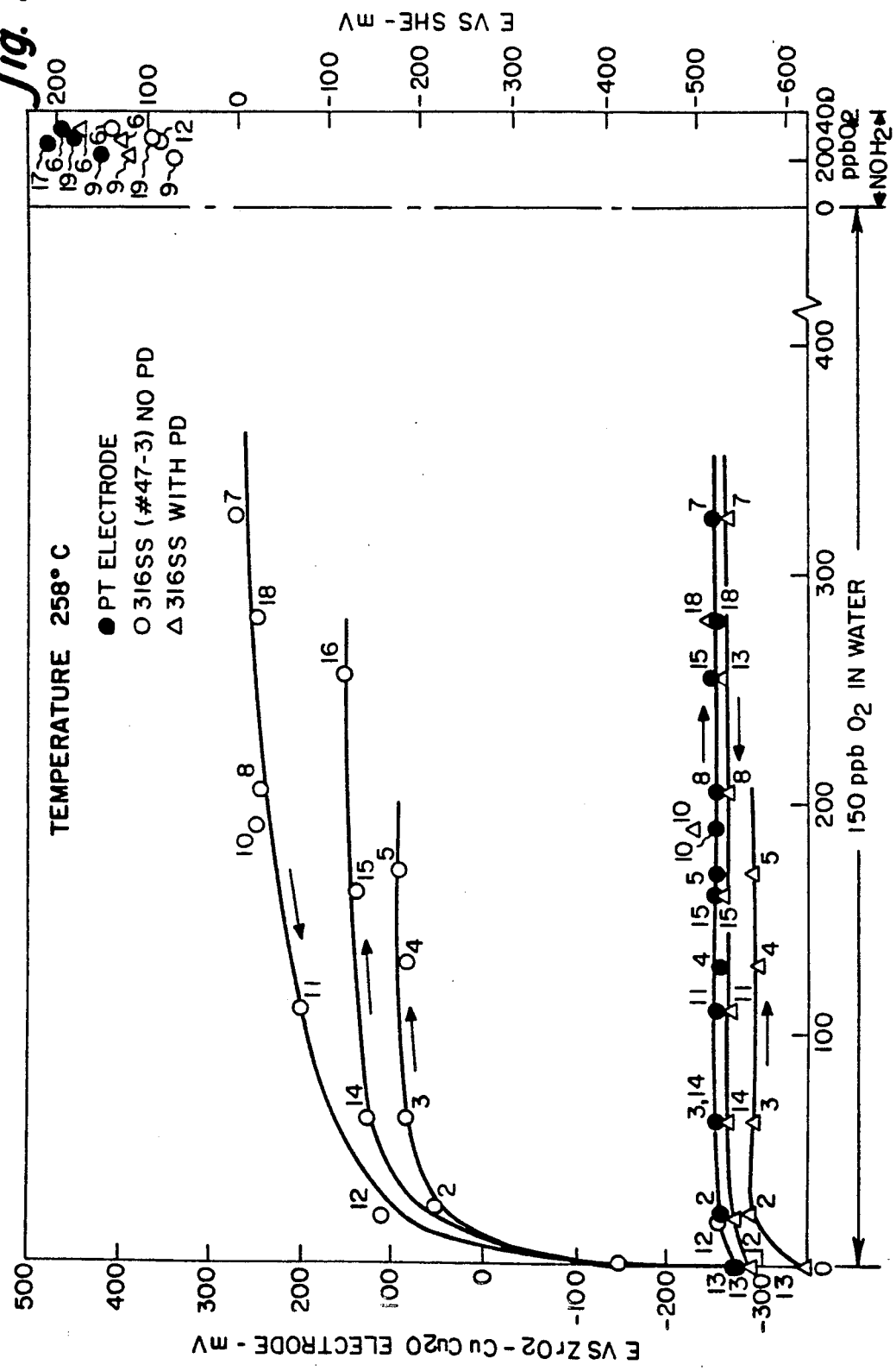
FIG. 1 is a graph in which potential of various electrodes is plotted against oxygen concentration in water. On the left is shown data obtained with 150 ppb hydrogen also in the water. No hydrogen is present in the water used in obtaining the data in the narrow band on the right.

It has been observed generally that the presence of oxygen in hot water in contact with reactor containment elements results in higher stress corrosion rates of these elements as compared to hot water in which little or no oxygen is present.

It has been further observed that stress corrosion cracking of the containment for high-temperature, high-pressure water such as is used for nuclear reactors is subject to change in rate depending on whether the electrochemical potential of the exposed stainless steel of such containment is above or below a critical potential range of values of −230 to −300 mV based on the standard hydrogen electrode (SHE). Stress corrosion cracking proceeds at a more accelerated rate in systems in which the electrochemical potential is above the critical range of values and at a substantially lower rate in systems in which the electrochemical potential is below the critical range of values. Water containing oxygen tends to result in potentials above the critical range while water in which little or no oxygen is present tend to have potentials below the critical range.

One way in which corrosion potentials of stainless steels in contact with reactor water containing oxygen can be reduced below the critical range is by injection of hydrogen into the water generally in amounts that stoichiometrically exceed the amount of oxygen in the water. This tends to lower the concentration of dissolved oxygen in the water and also the corrosion potential of the metal.

This injection of hydrogen into the high-temperature, high-pressure water in reactor containments has been effective in reducing stress corrosion. It has been found, however, that varying amounts of hydrogen have been required for different reactors in order to reliably and efficiently achieve the desired low potentials.

What I have proposed in combination with hydrogen injection is the modification of the internal surfaces of the stainless steel containment system in boiling water reactors, in order to improve the catalytic activity of the surface toward the hydrogen-water redox couple and thereby the reliability and efficiency of achieving corrosion potentials below the critical value.

As noted above, the injection of hydrogen into the high-temperature, high-pressure water has been effective in reducing the stress corrosion cracking of the containment for such high-temperature, high-pressure water. However, it was my belief that the increase in the catalytic activity at the surface of the containment exposed to the hydrogen-containing water would improve the effectiveness of the so-called "hydrogen water chemistry". There is thus a distinction between conventional "hydrogen water chemistry" which has been recognized in the past and the catalyzed "hydrogen chemistry" which I have proposed. By conventional "hydrogen water chemistry" is meant that there is a different chemistry in water which contains hydrogen usually to the extent of 150 parts/billion or more than there is when the hydrogen is at lower values. For this conventional hydrogen water chemistry to be effective the hydrogen must always be present in stoichiometric excess of the oxygen present and in such case there is a reduction or suppression of stress corrosion cracking as a result of the presence of the dissolved hydrogen. However, it was my belief that this stress corrosion cracking could be reduced to an even greater extent by increasing the catalytic activity at the metal surface in contact with the high-temperature, high-pressure water. In particular, I have found that the deposition of a small amount of a catalytically active material such as at least one metal of the platinum group of metals on the surface exposed to bulk high-temperature, high-pressure water is effective in the presence of less than a stoichiometric amount of hydrogen in reducing the corrosion potential or electrochemical potential at the surface and thereby in reducing the stress corrosion cracking which emanates from the surface. I refer to this as catalyzed hydrogen water chemistry.

Thus, although I have found that the conventional injection of higher concentrations of hydrogen into the high-temperature, high-pressure water can be effective in reducing the stress corrosion cracking, I have found that the effectiveness of the hydrogen in this role is limited by the irreversibility of the hydrogen-water redox couple on oxidized stainless steel surfaces. What I have proposed and what I have demonstrated experimentally through catalyzed hydrogen water chemistry is that the improvements in the reversibility of the hydrogen-water redox couple on oxidized stainless steel surfaces can be achieved by reducing the concentration of injected hydrogen and increasing the catalytic activity at the surface, thus facilitating the achievement of a desired lower corrosion potential, even with presence of higher residual oxygen concentrations than can be tolerated in the absence of the catalyst.

Further, I have found, through catalyzed hydrogen water chemistry, that this lower potential can be achieved with lower concentrations of hydrogen than have been needed and have been used in the prior art hydrogen water chemistry without the catalyst. Thus, I have recognized that the low corrosion potentials which are the objectives of the conventional hydrogen water chemistry efforts to reduce stress corrosion cracking can be achieved more reliably and in the presence of relatively high residual oxygen concentrations by increasing the catalytic activity at the metal surface coupled with the presence of lower concentrations of hydrogen in the water. I have discovered that it is possible to achieve the lower corrosion potentials more efficiently and with less hydrogen than in the absence of the catalyst.

I have proposed to improve the catalytic activity at metal surfaces by circulating a very dilute solution of a soluble salt of a metal of the platinum group of metals within the reactor vessel and piping prior to initiation of the operation of the reactor. In this way, a finely divided deposit of the platinum metal will form on the surfaces through a displacement reaction of the stainless steel components, or with the aid of an appropriate electroless reducing agent. Alternatively, replacement parts may be coated with a catalytic deposit prior to installation in a reactor; e.g. nozzles and recirculation piping.

Some of the beneficial effects of catalyzed hydrogen water chemistry will be made evident through the practice of the following examples:

EXAMPLE 1

Two coupons of 316 stainless steel were prepared for testing. Both coupons were 2" long, ⅜" wide, and ⅛" thick. The surfaces of the coupons were cleaned by grit blasting with fine alumina powder and were then etched for one minute in 1:1 HCl immediately prior to a plating operation. The plating operation employed was designed to deposit palladium by electroless plating processing onto the grit blasted coupons. The electroless plating process employed was a commercial procedure of the Callery Chemical Company, of Callery, Pa., and known as "First Choice" electroless palladium P-83.

One of the two coupon samples was premounted in a Conax fitting while the other coupon was free. The electroless plating treatment was concurrent for both coupons and both were plated concurrently in the same bath. On the basis of weight change of the free sample of 4.9 milligrams, a film thickness of 0.4 μm was estimated for the unmounted sample. This thickness of deposit was assumed to be the same for both samples. The thickness falls within the range anticipated for the electroless palladium plating process. However, to determine more precisely the thickness of the palladium coating on the coupon sample, tests were made to determine thickness employing a Seiko x-ray thickness gauge which was available for this purpose. A thickness of 0.79 μm (micrometer) was determined.

The sample on the Conax fitting was immediately transferred to a test loop which had been set up for a series of water chemistry studies. This loop was a closed loop provided with a pump to circulate water through an autoclave where the water was maintained at high-temperature, high-pressure and passed over the test specimens. The Conax mounted coupon was placed in the autoclave along with a second identical but palladium-free sample which had been used in earlier tests, and a platinized platinum electrode. The system was brought to a temperature between 280° and 285° C. and water containing 150 ppb (parts per billion) of dissolved hydrogen was circulated to flow over the specimen coupons at a flow rate of 200 milliliters per minute. Following a day's operation in this fashion, oxygen gas was also introduced into the feed water and the level of the oxygen gas was increased incrementally over a period of days.

Electrical measurements using a zirconia reference electrode as described in L.W. Niedrach and N.H. Stoddard, *Corrosion*, Vol. 41, No. 1 (1985) page 45, were made and data was plotted on a graph as depicted in FIG. 1. FIG. 1 is a graph in which the electrical potential is plotted against the concentration of oxygen in the test water in parts per billion of oxygen. The potentials of the two specimens and the platinum electrode, converted to the SHE (standard hydrogen electrode) scale, are shown as points 1-5 on the three separate plots representing the three different specimens on FIG. 1. As indicated by the legend, the open circles correspond to the electrical potential of the stainless steel sample with no palladium; the filled circles to the platinum reference electrode; and the open triangles to the stainless samples coated with palladium. Following point 5, problems were encountered with the test system thus necessitating a shut-down for about a month.

The system was then restarted and operated under simulated normal water chemistry conditions. These normal water chemistry conditions correspond to 200-300 parts/billion of dissolved oxygen with no added hydrogen. The system was operated with the normal water chemistry conditions as indicated for two days before reintroducing 150 ppb dissolved hydrogen into the feed water. The data points for the system before the introduction of the hydrogen are points 6 of FIG. 1 for the three specimens.

The oxygen level was then reduced step-wise over a period of several days to zero ppb. The step-wise reduction of oxygen is represented by the points 7-13 of FIG. 1 for the three specimens. One intermediate step was taken back to normal water chemistry during this period and the data points for this step are points 9 for each of the three specimens.

While still retaining the 150 ppb dissolved hydrogen, the dissolved oxygen level was then again increased to 256 ppb and the data for these changes are data points 14-16 of the figure for each of the three specimens. After these changes, the system was again returned to normal water conditions for a period of 8 days to determine whether the normal water conditions would have a deleterious effect on the palladium treated sample. At this point, conditions were returned again to hydrogen water chemistry, i.e., to hydrogen in the water at 150 ppb and the oxygen at 325 ppb. Under these conditions, the electrical potential of the palladium-treated coupon essentially followed that of the platinum electrode as the potential moved to a low value represented by the triangular point 18 for the palladium treated coupon on FIG. 1 while the untreated stainless steel coupon (open circle point 18) did not register a low potential.

Accordingly, from the results obtained from these tests, it became evident to me that the palladium-treated sample reached low potentials under the catalyzed hydrogen water chemistry conditions and had electrical potential essentially equivalent to the potential of the platinum electrode. Both were below the range of critical potential of −230 mV to −300 mV for the prevention of stress corrosion cracking. During this same period, the palladium-free sample polarized to much more positive potentials even at low levels of oxygen in the presence of hydrogen. The magnitude of this polarization was greater when an operating point was approached from normal water chemistry conditions than when lower oxygen levels were prevalent in the presence of hydrogen.

The data obtained from this example and plotted in FIG. 1 clearly demonstrate the effectiveness of the palladium treatment. The palladium treatment is deemed to be representative of treatment with any of the platinum family metals. Further, from the data obtained from this test, I have judged that even deposited thicknesses smaller than the 0.79 μm (7900 Angstroms) should be effective in protecting the stainless steel containment exposed to high-temperature high-pressure water from the influences which increase the level of stress corrosion cracking. I estimate that as little as 50 Angstroms of a platinum metal should be effective in significantly reducing stress corrosion cracking when used in combination with injected hydrogen in stoichiometric excess of the dissolved oxygen concentration.

In all of the testing of which I am aware of the stainless steel containment for high-temperature high-pressure water, there has never been a response in terms of the factors which reduce stress corrosion cracking equivalent to the response exhibited in the performance of this example. As can be seen from the example, the electrical potential of the palladium-coated sample tracks the electrical potential of the platinized-platinum electrode even with more than 300 parts/billion dissolved oxygen in the feed water. It will be noted that 300 parts/billion of oxygen is equivalent to 38 parts/billion of hydrogen and therefore the hydrogen is still in stoichiometric excess.

EXAMPLE 2

Figure 2:
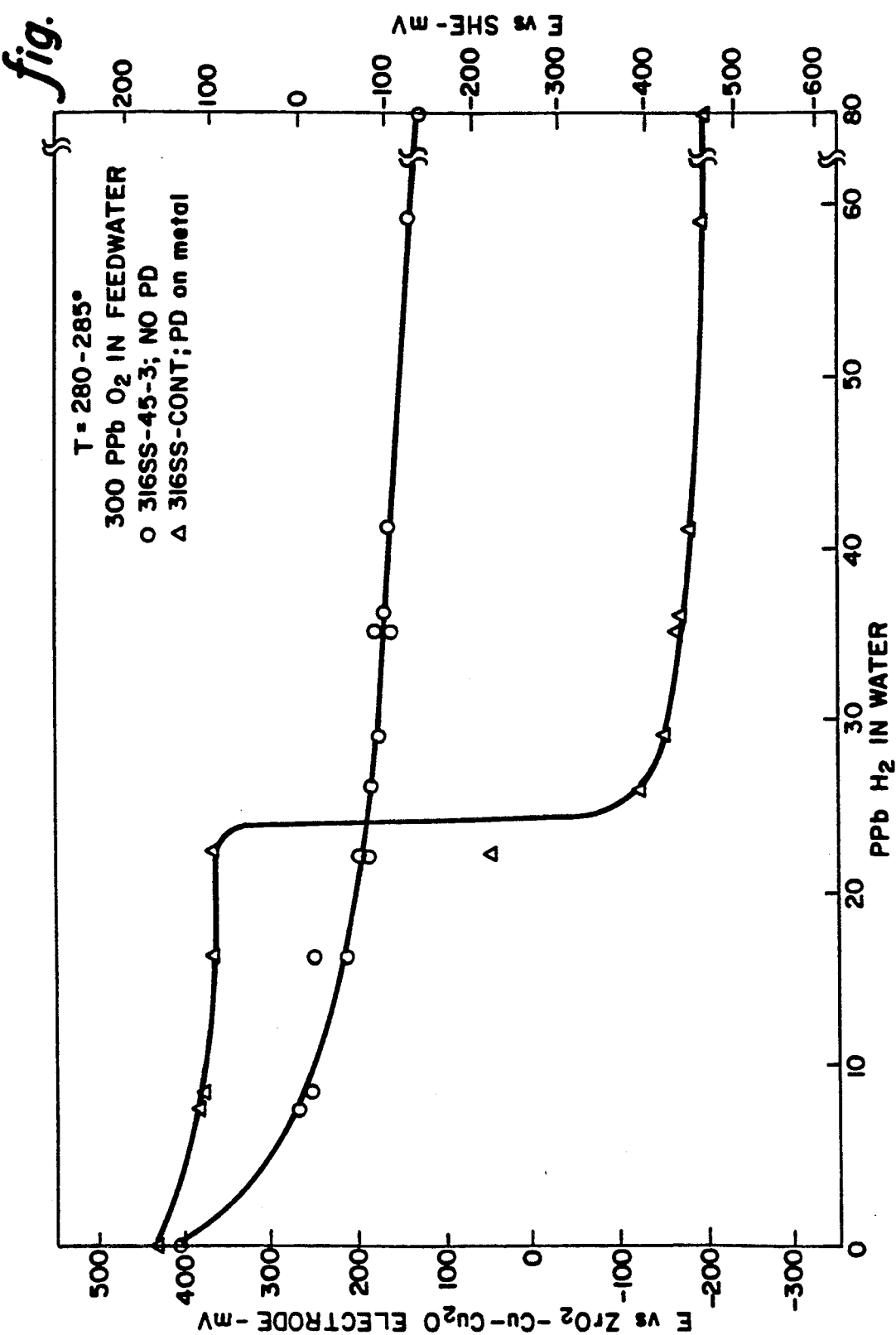
FIG. 2 is a graph in which voltage is plotted against hydrogen concentration in water with 300 ppb oxygen also in the water.

In FIG. 2, the effect of palladium treatment is illustrated in a different fashion. The tests carried out which resulted in these data involved increasing the amounts of hydrogen which were added to water containing a fixed amount of oxygen rather than the reverse as was the practice in Example 1. In contrast to the unpalladinized sample, in which case only small transitions of potential occur, with palladium on the surface a large shift from the higher potential range to a low potential range occurs abruptly at about 24 ppb hydrogen. The concentration of hydrogen that is stoichiometrically equivalent to 300 ppb oxygen for the formation of water is 37.5 ppb or 1.56 times the measured amount. Since the recombination reaction is believed to occur only on the metal surface, the lower observed value for hydrogen is deemed to reflect the fact that the diffusion coefficient of hydrogen in water is considerably higher than that of oxygen. As a result, the hydrogen and oxygen in this example arrive at the electrode surface in stoichiometric ratios for the formation of water even though the ratio of hydrogen to oxygen in the bulk water is substoichiometric.

It is likely that the sharp change in potential of the catalyzed surface does indeed correspond to the point where the flux of the hydrogen and the oxygen to the electrode surface are in stoichiometric balance. From these data, we then see that with the catalyzed surface the potential can be reduced to the desired level with far less hydrogen than is required in the absence of the catalyst. It should be beneficial with regard to the control of nitrogen shine in the turbine building since there is considerable evidence that low hydrogen levels in the water result in less production of volatile nitrogen species.

EXAMPLE 3

Figure 3:
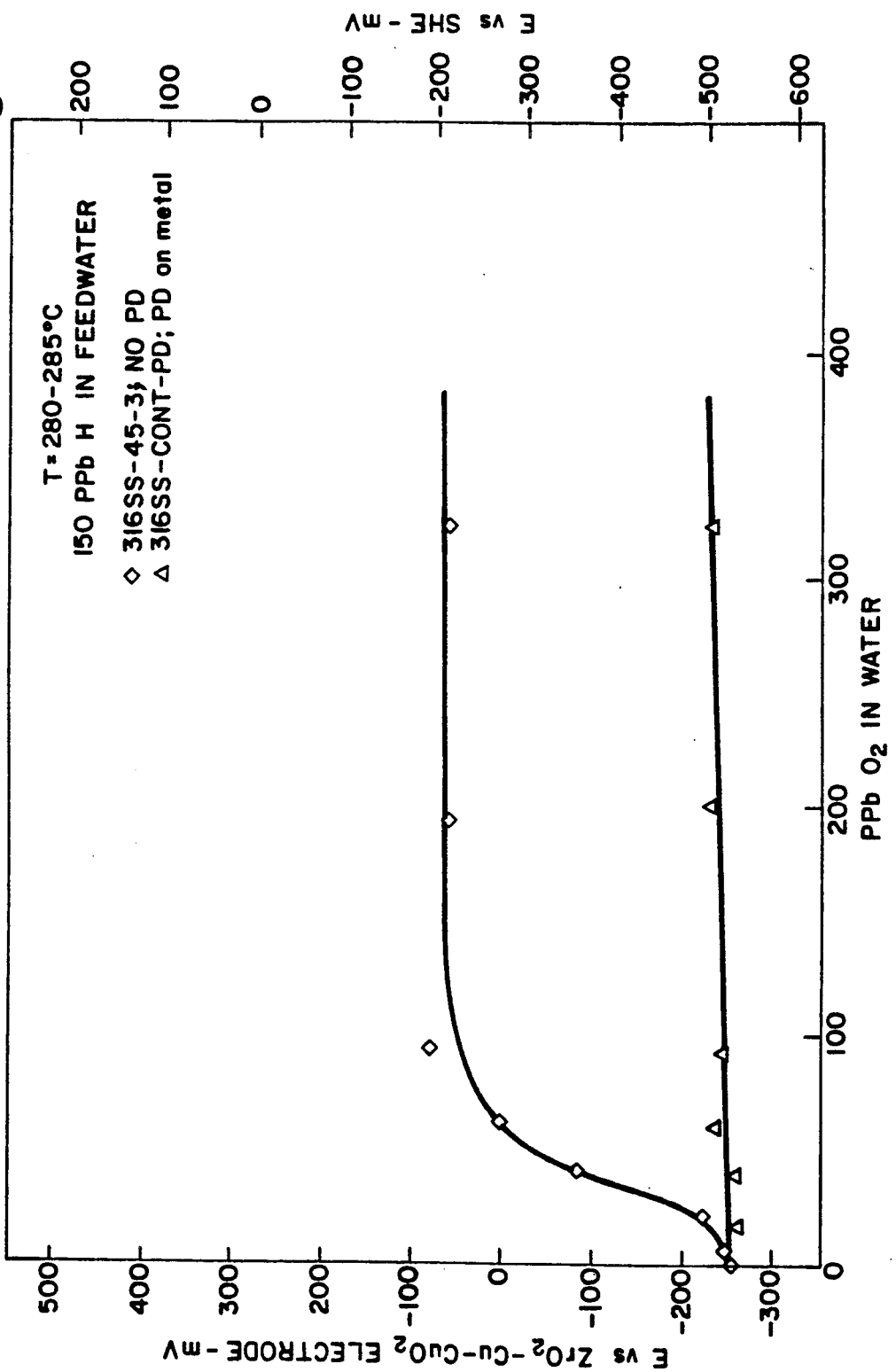
FIG. 3 is a graph similar to that in FIG. 1 in which voltage is plotted against oxygen concentration in water with 150 ppb hydrogen also in the water, but following several months of operation after FIG. 1.
Figure 4:
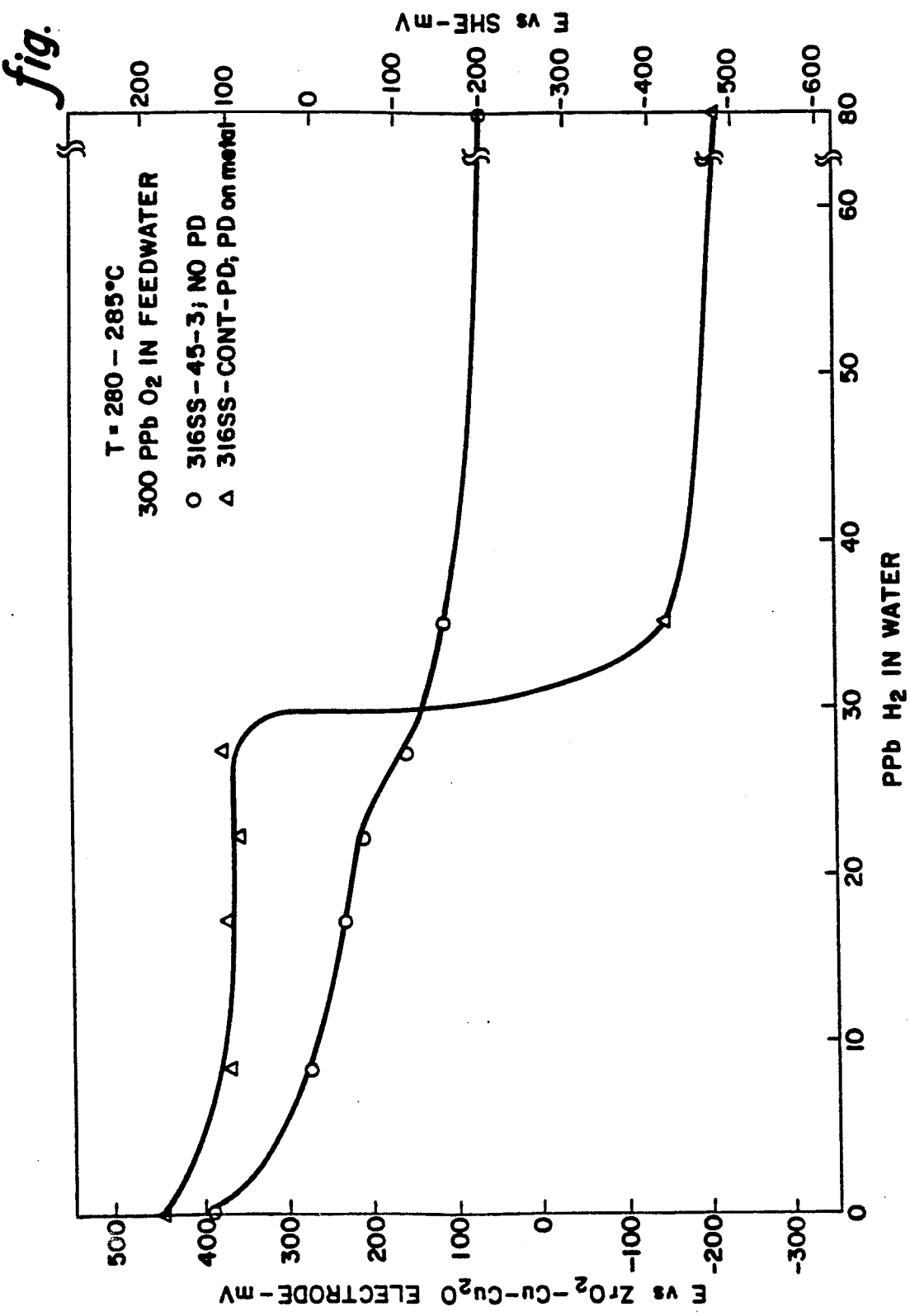
FIG. 4 is a graph similar to that of FIG. 2 above, but obtained after several months of operation of the samples tested and plotted in FIG. 2.

Two additional sets of data analogous to those of FIGS. 1 and 2 are shown in FIGS. 3 and 4. These were obtained after a total of 13 months of operation of sample 316SS-CONT-Pd and indicate that the behavior produced by the palladization is retained for extended periods.

Further, only marginal losses of palladium seem to have occurred as evidenced by the final column of thickness gauge data in Table I.

TABLE I

| | | Palladium Thickness Measurements (micrometers) | | |
|---|---|---|---|---|
| Sample | Side | Initial Values | After 7 Months of Operation | After 6 Additional Months |
| 316ss-47-3 | 1 | 0.00 ± 0.05* | 0.00 ± 0.05* | — |
| | 2 | 0.00 ± 0.05 | 0.00 ± 0.05 | — |
| 316ss-CONT-Pd | 1 | (0.78 ± 0.03)+ | 0.86 ± 0.04 | 0.79 ± 0.03* |
| | 2 | (0.79 ± 0.01) | 0.84 ± 0.04 | 0.80 ± 0.03 |

*One standard deviation
+The initial thickness measurement was obtained indirectly from a duplicate of 316ss-cont-Pd treated in parallel

EXAMPLE 4

A number of constant extension rate (CERT) tests were performed in a separate system using an Instron model 1131 test machine and a small autoclave with an external silver/silver chloride reference electrode as previously described in the literature: P.L. Andresen, "Environment-Sensitive Fracture: Evaluation and Comparison of Test Methods", ASTM STP 821, S.W. Dean et al. Eds., Am. Soc. for Testing Materials, Philadelphia (1984) page 271. In order to perform the CERT testing, cylindrical tensile specimens 0.2" gauge diameter×1" length were machined from welded AISI 304 stainless steel 102 millimeter diameter schedule 80 (heat no. 04836). These pipe samples were from a group previously used in extensive work reported in the literature by Andreson. See in this regard P.L. Andresen, in EPRI Report NP-2424-LD (June 1982) page 3—3.

The well-sensitized specimens were further heat treated at 500° C. for 24 hours in an argon atmosphere. Sensitization was confirmed by an oxylic acid etch test. Immediately prior to use—either directly in a CERT or for pre-palladinization—the samples were polished with wet 600 grit paper. Palladinization was performed as described in Example 1, but with variations in the plating, time, and temperature.

During the tests, the water was equilibrated with a mixture of nitrogen, hydrogen, and/or oxygen. A sulfuric acid concentration of $0.3 \times 10^{-6}$ molar was maintained by injection of a more concentrated solution into the main stream at a constant rate. This supply of sulfuric acid established a conductivity of approximately 0.3 microsiemen/centimeter in the feed water to the autoclave.

The potential of the insulated sample and of the autoclave were monitored against the reference electrode throughout the tests. Before the strain was applied to the test specimens, the specimens were exposed to normal water conditions at an oxygen level of 100 or 200 ppb for about 24 hours and then to the test conditions. The test conditions provided for the same level of oxygen in the water with hydrogen also in the water. The strain rate used in all of the testing was $1 \times 10^{-6}$/S.

After the specimens broke under tension, the fracture surface and adjacent surfaces were examined with the scanning electron microscope.

Results of these tests are summarized in Table II. Although AISI 304 SS samples were employed for the which was performed with the substoichiometric ratio of hydrogen to oxygen, showed extensive intergranular stress corrosion cracking. A number of intergranular cracks were also evident on the free surface near the break in both cases. In all other tests ductile fracture occurred accompanied by some transgranular cracking on the fracture and free surfaces, as has been extensively observed in other tests at low potentials.

It is, therefore, clear that the palladium coatings were successful in facilitating the achievement of corrosion potentials lower than those of the control specimens and, indeed, below the critical value for the prevention of SCC even with relatively high oxygen concentrations and low hydrogen concentrations in the water. Further, this behavior was achieved and sustained with a palladium coating as thin as 0.03 micrometer. In agreement with the potentials, the control sample and the palladinized sample deliberately held at a high potential (with an $H_2:O_2$ ratio at the sample surface of <2) manifested intergranular stress corrosion cracking while the remainder of the palladinized samples did not. This clearly demonstrates that the combination of the palladium coating coupled with the presence of the injected hydrogen is responsible for the improved behavior.

TABLE II

RESULTS OF CONSTANT EXTENSION RATE TESTS
T = 287° C.   $0.3 \times 10^{-6}$M $H_2SO_4$
Conductivity: 0.3 microsiemen/cm
Strain Rate: $1 \times 10^{-6}$/sec.

| CERT No. | Pd Thick. (μm) | ppb $H_2$ | ppb $O_2$ | Molar Ratio of $H_2:O_2$ | | Potential vs. SHE | | Time to Failure (Hrs) | Max Stress (Ksi) | Strain to Failure (%) | IGSC (%) |
|---|---|---|---|---|---|---|---|---|---|---|---|
| | | | | In Water (calc.*) | At Surface (calc.#) | Sample (mV) | Autocl. (mV) | | | | |
| 1 | 0 (control) | 161 | 95 | 27.1 | 49.6 | −102 ± 12 | 31 ± 11 | 70 | 59 | 25 | 26 |
| 2 | 0.77 | 161 | 104 | 24.8 | 45.3 | −535 ± 45 | −110 ± 20 | 124 | 67 | 45 | 0 |
| 3 | 0.77 | 16 | 196 | 1.3 | 2.4 | −515 ± 25 | −100 ± 30 | 125 | 69 | 45 | 0 |
| 4 | 0.77 | 9 | 196 | .7 | 1.3 | 50 ± 30 | −102 ± 32 | 76 | 59 | 27 | 33 |
| 5 | 0.07 | 19 | 251 | 1.2 | 2.2 | −490 ± 30 | −150 ± 20 | 118 | 68 | 42 | 0 |
| 6 | 0.03 | 20 | 263 | 1.2 | 2.2 | −400 ± 30 | −110 ± 10 | 126 | 70 | 45 | 0 |

*Molar ratio in water = 16 × ppb $H_2$/ppb $O_2$
Molar ratio at surface = 1.83 × Molar ratio in water; where 1.83 is the ratio of the diffusion coefficients for $H_2$ and $O_2$ in water derived from: P.T.H.M. Verhallen et al., Chem. Eng. Science, Vol. 171 (1989) page 323

Figure 5:
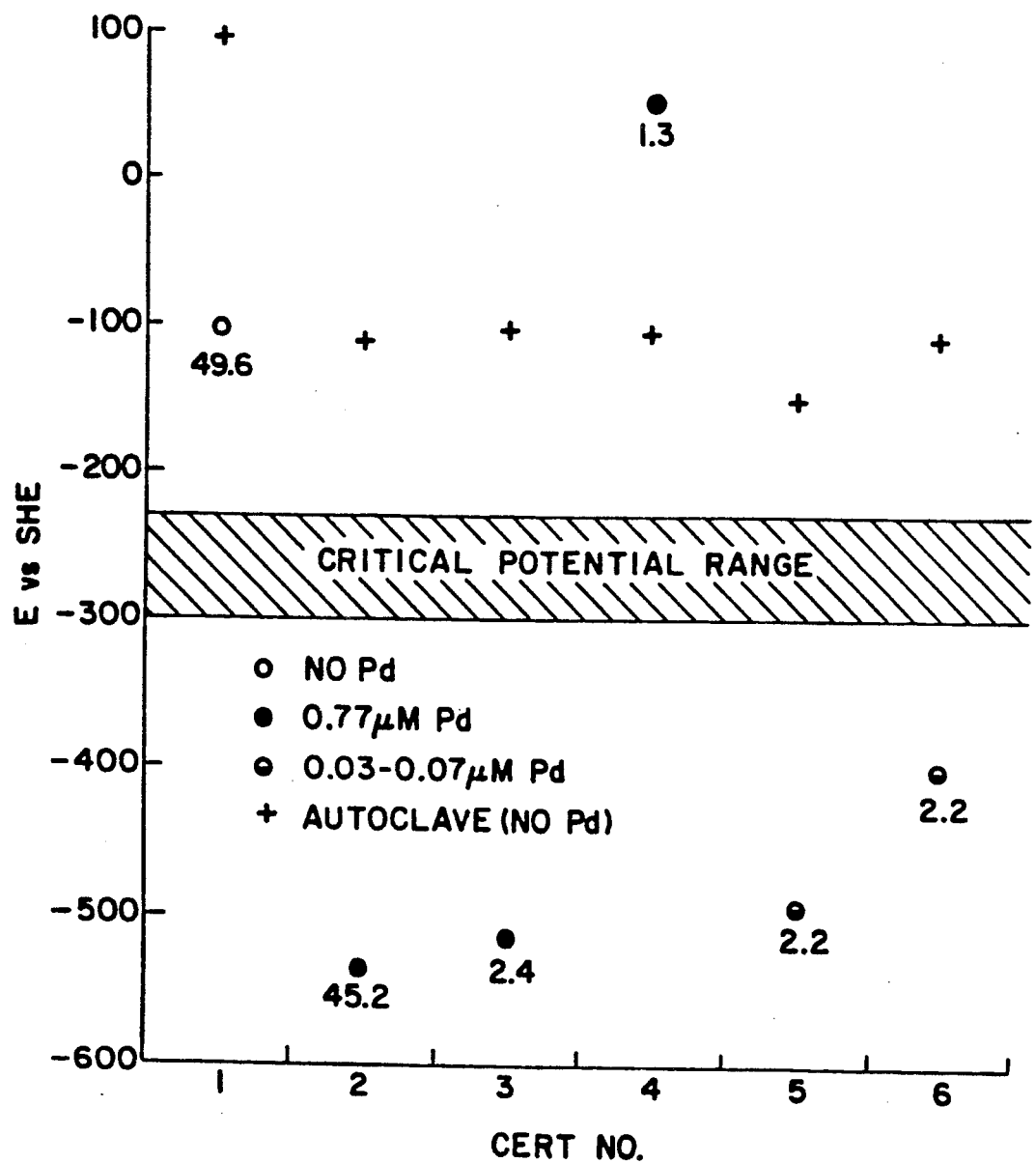
FIG. 5 is a graph in which voltage relative to the standard hydrogen electrode (SHE) is summarized for a number of CERT tests.

CERTs, their potentials were in accord with those of the AISI 316 flag-type samples used for the electrochemical measurements under similar water chemistry conditions. The relation to the critical potential for protection from SCC is shown more clearly in FIG. 5. Here, it is to be noted that the potential of the AISI 316 SS autoclave remained above the critical potential in all cases because it was not palladinized.

In all of the CERTs, the oxygen concentration in the water was maintained at a much higher level than is usually considered acceptable under BWR operating conditions employing HWC. It is also to be noted that the first two tests, which included the unpalladinized control, were performed at high hydrogen to oxygen ratios. For the remainder, the molar ratio of hydrogen to oxygen at the sample surface was held close to the stoichiometric value (2:1) for the formation of water based upon a ratio of 1.83 for the diffusion coefficients of hydrogen and oxygen. When the molar ratio at the sample surface was >2.0 the potential of the palladinized samples was well below the critical value even with only a 0.03 micrometer thick palladium coating. With a ratio of <2.0 the potential of the sample with a 0.77 micrometer thick coating was above the critical value.

Inspection of the fractured specimens with a scanning electron microscope revealed that only the unpalladinized control and the palladinized sample from test 4, The results obtained and listed in the above examples clearly establish the value of the combination of hydrogen injection and a platinum metal in facilitating the establishment of low potentials for extended periods of time.

What is claimed is:

1. As a containment for a boiling water nuclear reactor, a stainless steel containment, said containment having a deposit of a metal of the plantinum group of metals on the surfaces thereof exposed to high temperature, high pressure water of said boiling water nuclear reactor.

2. The nuclear reactor containment of claim 1, in which the deposit is formed by electrochemical means.

3. The nuclear reactor containment of claim 1, in which the deposit is formed by chemical vapor deposition.

4. The nuclear reactor containment of claim 1, in which the deposit of a metal of the platinum group metal is formed by sputtering.

5. The nuclear reactor containment of claim 1, in which the deposit is formed by evaporation from a source of said platinum group metal and condensed on the inner surfaces of the containment.

6. The nuclear reactor containment of claim 1, in which the coating is formed by a chemical replacement reaction.

7. The nuclear reactor containment of claim 1, in which the coating of the platinum group metal is formed by ion implantation.

8. The method of reducing the stress corrosion cracking of a high-temperature, high pressure containment system of a boiling water reactor which comprises coating the internal surface of said containment with a thin deposit of at least 0.03 micrometers of at least one metal of the platinum group of metals and dissolving hydrogen gas in the water of said boiling water reactor.

9. The method of claim 8, in which the concentration of hydrogen in the high-temperature, high-pressure water is below 150 parts per billion.

10. The method of claim 8, in which the platinum group metal is introduced into the high-temperature, high-pressure water by anodic oxidation and is subsequently deposited onto the reactive surfaces by autodeposition.

* * * * *